United States Patent [19]

Kaszmann

[11] Patent Number: 4,584,506

[45] Date of Patent: Apr. 22, 1986

[54] RELUCTANCE MOTOR WITH ELECTRONICALLY CONTROLLED STATOR WINDINGS

[75] Inventor: John Kaszmann, Willowdale, Canada

[73] Assignee: Polestar Magnetronics Inc., Willowdale, Canada

[21] Appl. No.: 674,429

[22] Filed: Nov. 23, 1984

[51] Int. Cl.⁴ .............................................. H02P 8/00
[52] U.S. Cl. .................... 318/254; 318/696; 318/701; 318/138
[58] Field of Search ............... 318/701, 696, 254, 139, 318/138, 685

[56] References Cited

U.S. PATENT DOCUMENTS

| | | | |
|---|---|---|---|
| 3,024,399 | 3/1962 | Valentino | 318/696 X |
| 3,444,447 | 5/1969 | Newell | 318/138 |
| 3,486,096 | 12/1969 | Cleave | 307/268 X |
| 3,560,817 | 2/1971 | Amato | 318/139 X |
| 3,560,818 | 2/1971 | Amato | 318/139 X |
| 3,560,820 | 2/1971 | Unnewehr | 318/139 X |
| 3,611,081 | 10/1971 | Watson | 318/138 |
| 3,697,839 | 10/1972 | Unnewehr | 318/138 |
| 3,697,840 | 10/1972 | Koch | 318/138 |
| 3,714,533 | 1/1973 | Unnewehr | 318/439 X |
| 3,748,554 | 7/1973 | McDonald | 318/439 X |
| 3,826,966 | 7/1974 | Nagasaka et al. | 318/341 X |
| 4,025,831 | 5/1977 | Webb | 318/254 |
| 4,229,685 | 10/1980 | Meier | 318/696 |
| 4,253,052 | 2/1981 | Meier | 318/696 |
| 4,348,619 | 9/1982 | Ray et al. | 318/139 |
| 4,350,943 | 9/1982 | Pritchard | 318/696 |
| 4,445,077 | 4/1984 | Kirschner | 318/696 |
| 4,459,519 | 7/1984 | Erdman | 318/254 |
| 4,500,824 | 2/1985 | Miller | 318/139 X |

Primary Examiner—William M. Shoop, Jr.
Assistant Examiner—Bentsu Ro
Attorney, Agent, or Firm—Ridout & Maybee

[57] ABSTRACT

In an electric motor having a stator with phase windings selectively energized to produce a progressively moving electromagnetic field and a magnetized rotor which seeks a minimum reluctance position within that field, energy withdrawn from a phase winding after de-energization so as to collapse the field produced by that winding passes from one end of the winding through a first connection to a capacitor where it is stored and re-applied through an alternative connection to the other end of the winding when it is next energized whereby to provide fast rise and fall of current in the winding without restricting the current which can intermediately be drawn by the winding from a principal power supply.

9 Claims, 6 Drawing Figures

RELUCTANCE MOTOR WITH ELECTRONICALLY CONTROLLED STATOR WINDINGS

FIELD OF THE INVENTION

This invention relates to electric motors operating on the reluctance principle, this term being used in a broad sense to refer to motors in which a changing electromagnetic field is generated by a stator, and poles of a normally unwound ferromagnetic rotor move in that field towards a minimum reluctance position whose angular location is progressively altered by the changing electromagnetic field so as to produce continuous rotation of the rotor. In principle, the functions of the rotor and and stator can be interchanged, but in practice it is usually more satisfactory for the electromagnetic field to be produced by the stator since this eliminates the necessity for slip rings or commutators, and this arrangement will be assumed in the following specification and claims. The polarization of the rotor may be induced in soft magnetic material by the stator electromagnetic field, as is usually the case in reluctance motors as commonly so called, or the rotor poles may be permanently polarized by permanent magnets comprised by the rotor, as in most stepper motors and many forms of brushless direct current motor.

BACKGROUND OF THE INVENTION

Most electric motors have traditionally been provided with both stator and rotor windings, even though in many induction motors the latter may be simplified to a "squirrel cage", and rely upon either conduction through commutators or slip rings, or upon induction, to energize the rotor. Induction motors normally require an alternating supply for their operation, and are not in general well adapted to variable speed operation since their optimum operating speed is intimately related to the velocity of the rotating field generated by the alternating supply. Direct current motors on the other hand require some form of commutative switching of the supply to the rotor to provide continuous rotation, and such commutators are expensive to build and maintain, as well as a source of undesirable broadband electrical interference. Control of such motors where accurate speeds or displacement control is required remains complex and difficult.

As a result, attention has been given, for a wide range of potential applications ranging from motors for consumer electronic equipment to large appliance, traction and industrial motors, to motors of the reluctance type in which the current through stator windings is switched, usually in modern designs by solid state devices, so as to produce a changing electromagnetic field which will result in progressive angular movement of poles of a stator as it seeks a minimum reluctance position within the field. This movement may be in the form of discrete steps, individually controlled, as in a stepper motor, or the movement of the rotor may be sensed by some suitable means to switch the current through the stator windings so as to provide a free running mode in which successive steps or impulses run together to provide continuous rotation. Regardless of the mode employed, the inductance of the windings provides difficulties as they are progressively switched, since it limits the rate of increase of the current upon energization and the rate at which magnetic energy can be dispersed when no longer required, particularly if excessive potentials are not be induced in the windings.

One widely used approach to the second of the above problems has been to utilize so-called "free-wheeling" diodes connected across the various windings. When external current to a winding is interrupted, the diode provides an alternative path for the current induced in the winding by the collapsing magnetic field, and the current thus recirculates until the field is fully collapsed, giving a slow fall in current. The rate of collapse can be increased by incorporating a resistive element in the circuit, but this reduces efficiency. Such a resistive element can also be used to assist rapid build up of the field, by acting as a current limiting device which permits application of higher energization potentials than would otherwise be possible. In many actual or potential applications of such motors, efficient operation and high torque over a wide range of speeds is required, and to attain these objectives it is necessary to achieve rapid current rise and fall times in the windings without unnecessary dissipation of energy as heat so that the fields of the stator and rotor can be maintained in optimum relationship. If rise and fall times are too slow, there will either be overlap with different windings producing opposing fields at some stages in the cycle, or the speed and/or torque obtainable will be limited.

One approach to the problem of obtaining rapid fall times has been to regenerate current from the stator windings to the supply. Thus in U.S. Pat. No. 4,229,685 issued to Meier, the freewheeling diodes are supplemented by diodes which divert current through a regulator circuit and back to the supply thus recovering the energy stored by the field generated by a winding following deenergization of the latter whilst assisting in rapid collapse of the field. In order to promote rapid build up of the magnetic field, however, Meier utilizes a chopping current regulator to limit current through the motor winding, which also serves to select a particular winding, together with a secondary switch which takes the freewheeling diode out of circuit except when that winding is energized. Such a system requires that the supply potential to the motor be high enough to provide the desired rate of current build up in the windings, and also requires the use of chopping regulators capable of sustaining the supply potential. The Meier patent refers to a stepping motor which can be operated in free running mode. A somewhat similar arrangement is described in U.S. Pat. No. 4,459,519 issued to Erdman. This relates to a motor with a permanent magnet rotor apparently primarily intended for refrigeration systems, and whilst a different system is used for regulating the current in the windings, the rate of current build up is still limited by the supply potential. Yet further similar arrangements as applied to various configurations of motor having magnetic rotors of both homopolar and heteropolar constructions are described in U.S. Pat. No. 3,826,966 issued to Nagasaka et al. Yet a further arrangement operating upon this principle is shown in U.S. Pat. No. 3,748,554 issued to McDonald.

A further problem which frequently arises in the design of brushless DC motors is that of turning off the switching semiconductors utilized to provide control of the current supplied to the field windings. The most readily available and economical semiconductors for the purpose are thyristors which have a controlled turn on ability but usually can only be turned off by reducing the current through the device to near zero. Furthermore, when turn off is achieved, stored energy in the inductive circuits being controlled can give rise to high potential spikes which can destroy the semiconductors if not properly controlled. For this reason commutation circuits have been developed for use in such applications which are essentially of ring counter configuration in that the turn on of the device controlling one winding is utilized to discharge one plate of a capacitor connected to the supply to the previously turned on device so as momentarily to divert the current to that device to the other plate of the capacitor and thus interrupt the current flow through the device for long enough that it switches off. Once it is switched off, recharging of the capacitor occurs, thus taking up some of the energy from the collapsing field of the associated winding.

Although the capacitors used in such circuits can contribute to the transfer of surplus energy from one winding to the next, this is not their primary purpose, and the arrangement is only useful in cases where the supply to a following winding can be turned on before that to a previous winding is terminated. Examples of such arrangements may be found in U.S. Pat. Nos. 3,611,081 issued to Watson, and 4,445,077 issued to Kirschner.

In U.S. Pat. No. 3,444,447 issued to Newell, an arrangement is described for improving the rise and fall times of currents in the windings of a step motor. Firstly, the supply is utilized to charge capacitors associated with control circuits for each winding, the circuit being arranged and the capacitor being switched so that its charge potential is added to the supply potential when the associated winding is energized, thus initially boosting the supply potential and improving the current rise time. Additionally, as described with reference to FIGS. 7 to 9, an arrangement using diodes and/or autotransformers is utilized to transfer energy from the collapsing field of a winding which has just been turned off to boost the potential applied to a winding that has just been turned on, thus improving both rise and fall times and improving efficiency. The first of the techniques disclosed by Newell provides a degree of boost which is substantially constant regardless of operating conditions, whilst the second technique is applicable only where the turning on of one winding is simultaneous with the turning off of another.

In U.S. Pat. No. 3,486,096, issued to Van Cleave, windings of a stepper motor are transformer coupled in pairs, and the switching means for each winding is operative to block current flow in a forward direction only. One or more diodes are placed in series with a D.C. supply so that current can flow from the supply in a forward direction only, and unswitched ends of the windings, or pairs of them, are connected to a capacitor or capacitors whose other plates are grounded. When forward current through a winding is interrupted, a current in the reverse direction is induced in the winding coupled thereto, and charges the associated capacitors to a high potential, whilst the field produced by the original winding rapidly collapses. When a switching device again permits forward current through a winding connected to the capacitor, the high potential carge on the capacitors assists rapid current build-up in that winding. The primary purpose of the arrangement is to speed up operation and protect the switching device; efficiency is evidently not a concern since resistors are placed in series with the supply to limit current. Moreover, the device is applicable only to motors having a suitable winding arrangement so that transformer action may be utilized to reverse the direction of current flow in the windings during energy recovery.

A group of related U.S. Pat. Nos. 3,560,817 and 3,560,818 issued to Amato, 3,560,820, 3,697,839 and 3,714,533 issued to Unnewehr, and 3,697,840 issued to Koch, and all assigned to Ford Motor Company, relate to various configurations of control circuits for reluctance type motors, in each of which a tuned circuit comprising capacitors and inductors (which may be or comprise the motor winding) are used in conjunction with solid state switching elements, utilizing resonance effects to increase the effective potentials available to provide fast rise and fall times, and to reverse the polarity of charge received from the circuit when a primary supply is cut off. Although there are differences between the arrangements described in these various Ford patents their general principle of operation relies on drawing current from the primary supply in pulses of approximately half-sine wave form. Since the period of the pulses is set at a substantially constant magnitude by the reactive components in the circuit, provision for different motor speeds is provided by varying the number of pulses delivered during each energization phase of a winding, substantial continuity of current flow in the winding between pulses being obtained both by freewheeling effects and by charge reversal and re-application of energy recovered during field collapse. In some of the arrangements, the circuit is operated so as to build up potential on a capacitor to a level much greater than the supply, which potential is applied so as to augment the magnitude of the current pulses from the supply. In the Unnewehr U.S. Pat. No. 3,714,533, it is disclosed that surplus energy from this capacitor may be tapped off by suitably timed firing of an SCR and returned to the supply if not required to drive the motor. Various methods for controlling the various motors disclosed are discussed, in general involving fairly complex control of the firing sequence of the several controlled rectifiers associated with each winding. In each case, it appears that operation requires an inductor in series with the supply additional to the motor winding, and that the operating parameters of the circuit are critically dependent upon the value of this inductor and also those of an energy storage capacitor. These same elements also limit the rate at which energy can be drawn from the supply, since the resonant characteristics of the load limit both the periods over which current can be drawn from the supply and the rate of supply current rise and fall.

U.S. Pat. No. 4,025,831 discloses a motor having in one embodiment plural stator windings and a permanent magnet homopolar rotor in a physical arrangement somewhat resembling the physical arrangement of the preferred embodiment of the motor described hereinbelow. The control system of the motor is however quite different, as is the mode of operation, no special provision being made for improving current rise, and fall times in the stator windings, or for recovering energy from collapsing stator fields.

An object of the present invention is to provide a motor of the general class discussed in which rapid rise and fall of winding current can be obtained at timings appropriate to ensure effective development of motor torque over a wide range of motor speeds, without the necessity for expedients which are wasteful of energy (such as added series resistance), without unduly restricting the rate at which energy can be drawn from the supply to meet torque demands, and without the necessity for highly sophisticated control means for matching the motor characteristics to load requirements.

According to the invention, an electric motor, of the type having a stator with multiple sequentially energizable phase windings and a rotor magnetized to seek a minimum reluctance position with a progressively moving electromagnetic field produce by said phase windings, first controlled switching means in series relative to a D.C. supply with each phase winding, and means to control said first switching means to produce said progressively moving electromagnetic field has (a) a charge storage capacitor associated with each such phase winding, with one terminal of said capacitor having a low impedance path to the supply, and the other terminal having alternative connections to opposite ends of the winding, the first such connection being established by diode means to that end of the winding connected to the first switching means, the diode means being oriented to permit passage of forward current continuing in said winding after turn-off of the switching means, and the second such connection to the other end of the winding being established by second controlled switching means, and (b) means to turn on said second switching means substantially simultaneously with said first switching means.

As compared to the Van Cleave arrangement discussed above, this arrangement has the advantages that it does not require any special arrangement or operating sequence of the motor windings in order to utilize the energy recovered by the capacitor, nor does it require the primary switching device to have bidirectional current carrying capabilities, as does the Van Cleave arrangement. Additionally, in the Van Cleave arrangement, the switching devices must be able to withstand, in their blocking condition, at least twice the maximum potential applied to the capacitor because of transformer action in the windings. Whilst this may not be a serious problem with the small stepper motors for which the Van Cleave arrangement is clearly intended, it becomes a serious limitation in larger motors.

As compared to the Ford patents discussed above, the values of the reactive components of the present applicant's arrangement do not limit the maximum current which can be drawn from the supply, nor the proportion of the active period of a phase winding during which current may be drawn if necessary. Essentially, the value of the capacitor in relation to the inductance of the associated winding determines the rates of current rise and fall which can be achieved in the winding, and the proportion of the active period of a phase winding during which it is necessary for current to be drawn from the supply. Under normal operation, the current to energize a winding is supplied from the capacitor, and current is only drawn from the supply in the latter part of the period during which the primary switching means is switched on, this current draw providing make-up for energy output to a load or dissipated by motor losses. It should be noted that the charge on the capacitor can be tapped by means of a suitable circuit so that the motor can operate also as a DC to DC up-converter, or so as to recover energy from a load under overrun conditions, or so as to provide regenerative braking of a load. Under such overrun or braking conditions the energy stored in the capacitor will be in excess of that required to maintain rotation of the motor and the excess may be recovered by drawing current from the capacitor when its potential exceeds a certain level.

Further features of the invention, and further explanation of its construction, will become apparent from the following description of an exemplary embodiment with reference to the accompanying drawings.

Figure 2:
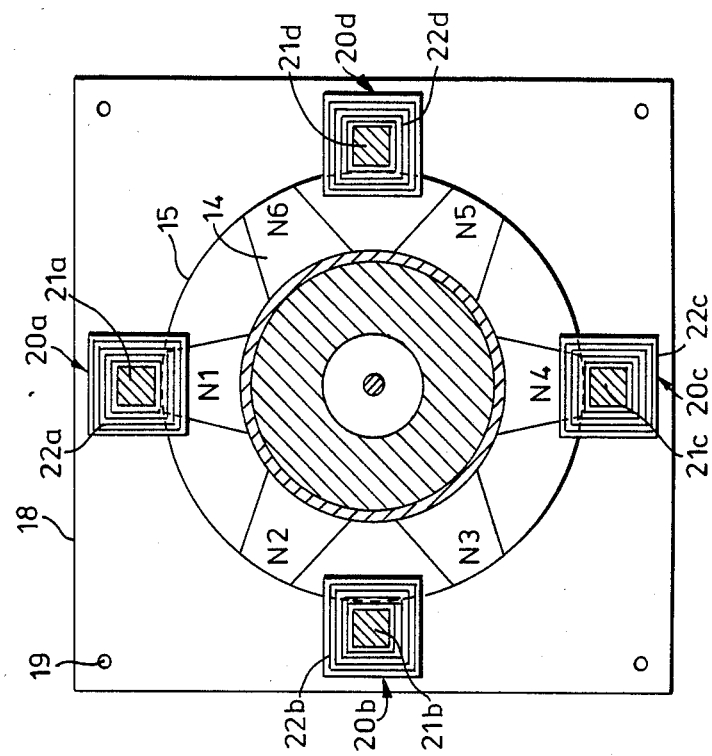
FIG. 2 is a section taken along line 2—2 in FIG. 1.
Figure 1:
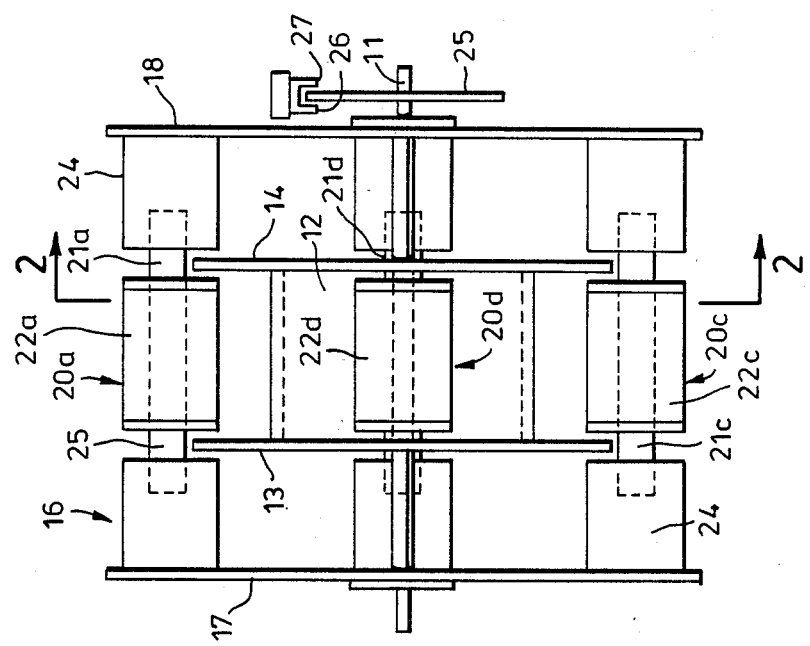
FIG. 1 is a front elevation of the stator and rotor of apparatus embodying the invention.

Referring to FIG. 1, and sometimes to FIG. 2, apparatus embodying the present invention includes a rotor 10 which, in the embodiment shown, includes a rotatable shaft 11 on which a permanent magnet 12 is mounted and fixed, e.g. by keying or by any other suitable means, and on which two, spaced apart toothed wheels 13 and 14 are mounted and fixed, again by keying or by any other suitable means.

The toothed wheels are identical to each other and, in the embodiment shown, each have six teeth spaced 60° apart.

This is not critical, however, and the number of teeth may vary widely. The toothed wheels are mounted with respect to each other on shaft 11 so that the teeth of the toothed wheels align with each other.

Each toothed wheel is made of a magnetizable material, i.e., a ferromagnetic material, e.g., steel, and thus each tooth of each toothed wheel constitutes either a north or a south pole, all of the teeth on one toothed wheel being of the same polarity and all of the teeth on the other toothed wheel also being of the same polarity but of opposite polarity to that of the teeth of the first-mentioned toothed wheel. In FIG. 2 the six teeth of toothed wheel 14 are shown as north poles N1 to N6 inclusive.

Many variations in the rotor are possible. For example, individual permanent magnets may be employed in place of one permanent magnet and ferromagnetic toothed wheels, or the rotor may be magnetized by fields produced by windings on the stator. Moreover, heteropolar as well as homopolar rotor pole configurations may be utilized with suitable stator winding configurations. In the example described, however, the rotor will have permanent magnet means mounted on and fixed to a rotatable shaft, the permanent magnet means having a plurality of spaced apart north poles and a plurality of spaced apart south poles, and both homopolar sets of poles will be movable in two circular paths, one of which is shown at 15 in FIG. 2.

In the embodiment of the invention shown, the stator 16 consists of two spaced apart stationary plates 17 and 18 that happen to be of square configuration and that are held in fixed, parallel relationship with respect to each other by suitable spacers or fastening devices 19; four electromagnets 20a, 20b, 20c and 20d; and holders 24 for the electromagnets.

Plates 17 and 18 may be made of aluminum, for example, as may holders 24 and spacers or fastening devices 19. Other suitable materials that are non-ferromagnetic also may be employed.

Each electromagnet 20a, 20b, 20c and 20d consists of a ferromagnetic core 21a, 21b, 21c and 21d respectively and a coil 22a, 22b, 22c and 22d respectively. Holders 24 are secured to plates 17 and 18 and cores 21a–21d fit into openings provided in holders 24.

The number of electromagnets may be varied without departing from this invention, but sufficient electromagnets must be employed to make it possible to creast a progressively charging magnetic field which, through interaction with the permanent magnets of rotor 10, causes rotation of rotor 10.

Electromagnets 20a–20d are evenly spaced apart from each other (at 90° in the illustrated embodiment) and, as best shown in FIG. 2, are mounted sufficiently close to the circular paths travelled by the north and south poles of rotor 10 that the poles are capable of inducing voltages in the coils of the electromagnets and the electromagnets are capable of magnetically attracting and/or repelling the poles as the latter rotate past the electromagnets.

It will be understood, of course, that plates 17 and 18 carry bearings for shaft 11, and shaft 11 may be coupled to any rotary equipment that is to be driven thereby.

Mounted on shaft 11 is an apertured timing wheel 25 on opposite sides of which are light sources 26 and photo-detectors 27. These components constitute a source of trigger pulses or timing pulses. Light sources 26 and photodetectors 27 are mounted on a holder which can be rotated relative to the apertures in timing wheel 25 to vary the phasing of the trigger pulses.

It will be appreciated, of course, that many other types of devices may be used for generating trigger pulses without departing from the present invention. For example, a microswitch contacted by a projection on shaft 11 could be used.

Figure 4:
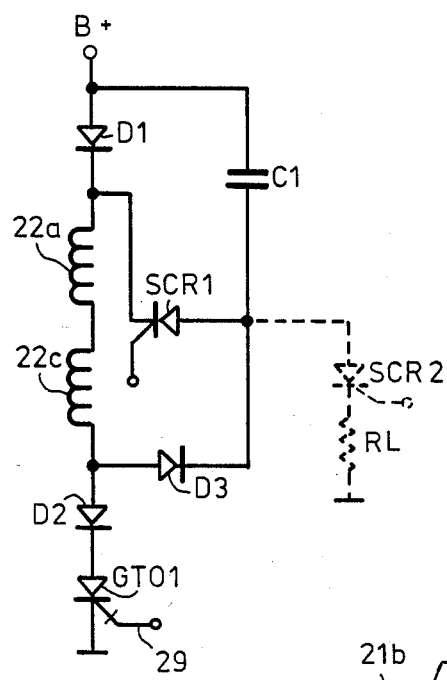
FIG. 4 is a circuit diagram useful in explaining the switching operation that takes place in the practice of the present invention.
Figure 5:
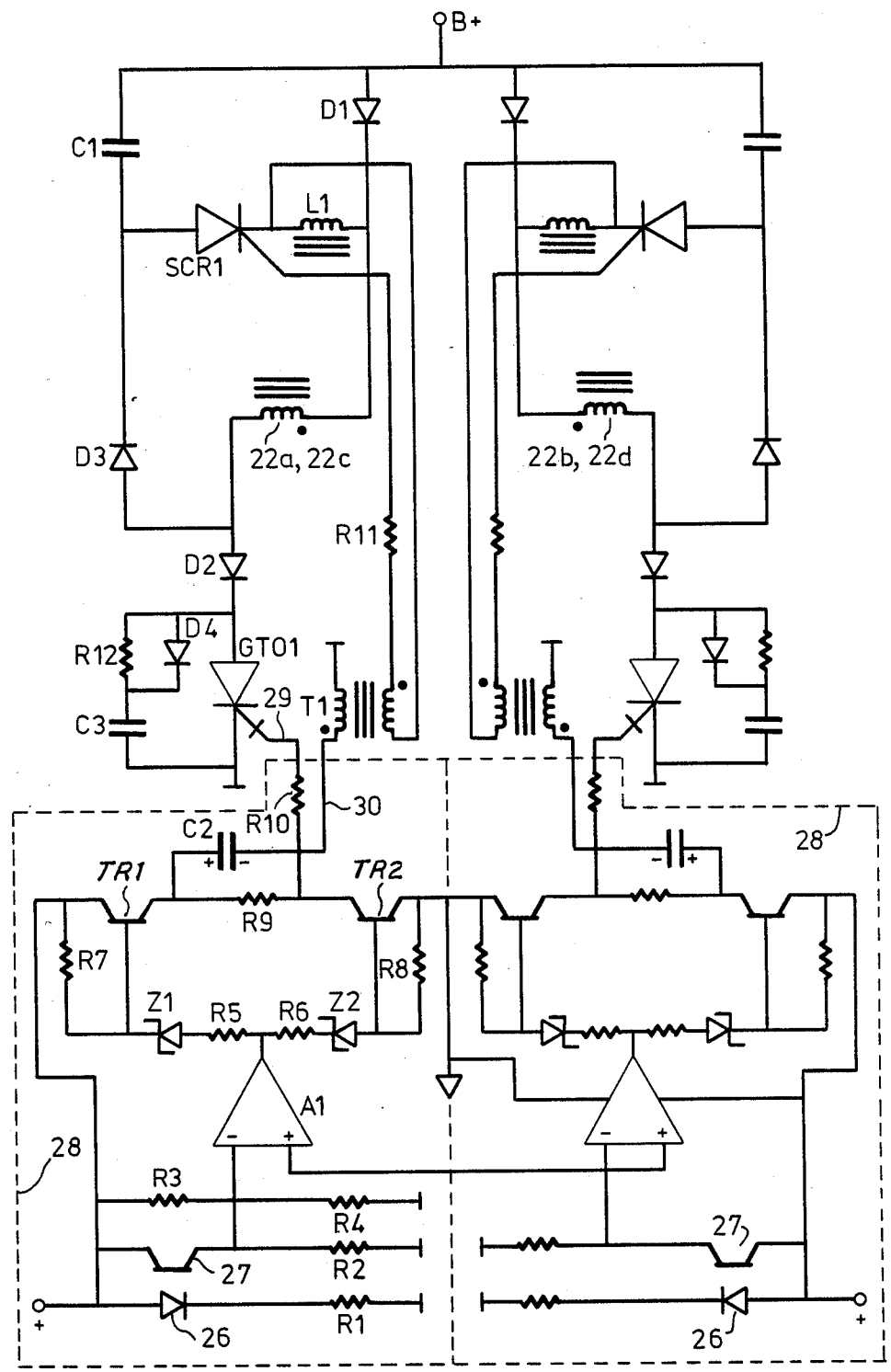
FIG. 5 is a circuit diagram of trigger pulse generating and switching circuitry that may be used in practising the present invention.

Referring now to FIG. 5, the trigger pulse generating and switching circuitry for coils 22a and 22c and for coils 22b and 22d is shown along with electrical energy utilization circuitry. Only the switching circuitry and electrical energy utilization circuitry for coils 22a and 22c is shown in FIG. 4. The switching circuitry and electrical energy utilization circuitry for coils 22b and 22d is the same as that shown in FIG. 4, as will be evident from FIG. 5.

Since the trigger pulse generating circuitry, switching circuitry and electrical utilization circuitry is the same for the two sets of coils, it will be described in detail only for coils 22a and 22c.

Shown within line 28 is a standard trigger pulse generating circuit that provides trigger pulses on conductors 29 and 30, the former being connected to the gate electrode of a gate turn off device GTO1 and the latter being connected via a transformer to the gate electrode of a silicon controlled rectifier SCR1.

A D.C. power supply (represented by B+ and ground) is provided with B+ being connected via a diode D1, coils 22a and 22c and a protection diode D2 to the anode of gate turn off device GTO1, the cathode thereof being grounded. Provided that the pulse generating circuit is suitably modified to provide appropriate switching waveforms and potentials, the gate turn off devices may be replaced by bipolar or field effect transistors.

Also associated with coils 22a and 22c is an electrical energy storage device which, in the embodiment shown in FIGS. 4 and 5, is simply a capacitor C1.

One plate of the capacitor is connected to a terminal of the supply; in the example shown this is the B+ terminal. Any connection is acceptable that will provide a low impedance source or sink for capacitor charging and discharging currents required to accommodate changes in potential of the other plates. This other plate is provided with two alternative connections to opposite ends of the phase winding comprising the coils 22a and 22c (in the example shown in FIG. 4). The first connection is to that end of the winding electrically adjacent the switching means provided by the gate turn off device GTO1 and its associated protection diode D2, and incorporates the diode D3 so that this connection can only accommodate charging currents tending to increase the potential on the associated plate of capacitor C1. The second connection is made to the other end of the winding via a thyristor SCR1, which when triggered on will pass discharging currents from the associated plate of capacitor C1. The diode D1 prevents the thyristor from appearing when turned on as a short circuit across capacitor C1, and permits the other end of the winding to rise to a potential above B+.

Referring to FIG. 5, the left and right halves of the circuit shown are identical and essentially independent except for sharing one bias circuit as a matter of convenience, and except that in the example shown they receive input from separate sets of light sources 26 and photodetectors 27, spaced 90° apart in relation to the timing wheel 25 so that they operate 90° out of phase with one another, and the left half of the circuit incorporates the coils 22a, 22c whereas the right half incorporates the coils 22b, 22d.

Each trigger circuit 28 has an input amplifier A1 connected to a bridge formed by resistors R2, R3 and R4 (R3 and R4 being common to both amplifiers) and a phototransistor forming the photodetector 27. When apertures in the wheel 25 permit light from a light emitting diode fed through resistor R1 and forming the light 26 to fall off the photodetector, the collector to emitter resistance of the latter falls and reverses the direction of imbalance of the bridge, thus causing the comparator A1 to apply a switching transition to the conventional push-pull output circuit formed by complementary transistors TR1 and TR2 and associated bias components R5, R6, R7, R8, R9 and zener diodes Z1 and Z2. The output of this circuit is applied via a current limiting protection resistor R10 to the device GTO1 via line 29, and via a differentiating capacitor C2, a pulse transformer T1, and a current limiting protection resistor R11 to the gate of thyristor R1. A small inductance L1 is located in series with the cathode of the thyristor to limit the rate of current increase through the thyristor to within its specifications. This inductance, and other components already mentioned, and the resistor R12, capacitor C3 and diode D4 associated with the gate turn off device GTO1, whose purpose is solely the protection of associated components, do not significantly alter the operating mode of the circuit, and they will not be further discussed. The actual values of the components utilized, and the selection of the semiconductors to be utilized, is heavily dependent upon the size of the motor and the supply potential utilized, and the necessity to operate within the specifications of the available semiconductors under all anticipated operating conditions.

Figure 3A:
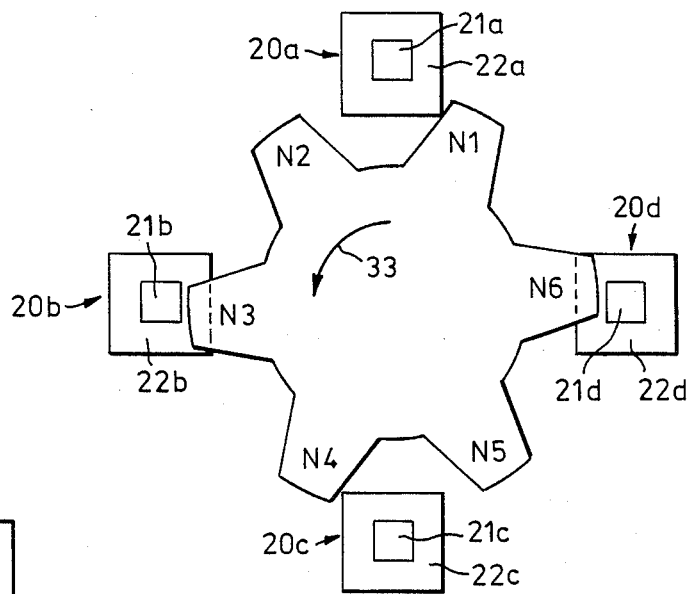
FIGS. 3a and 3b are views similar to FIG. 2 showing various positions of the rotor and stator and useful in explaining the operation of the apparatus.
Figure 3B:
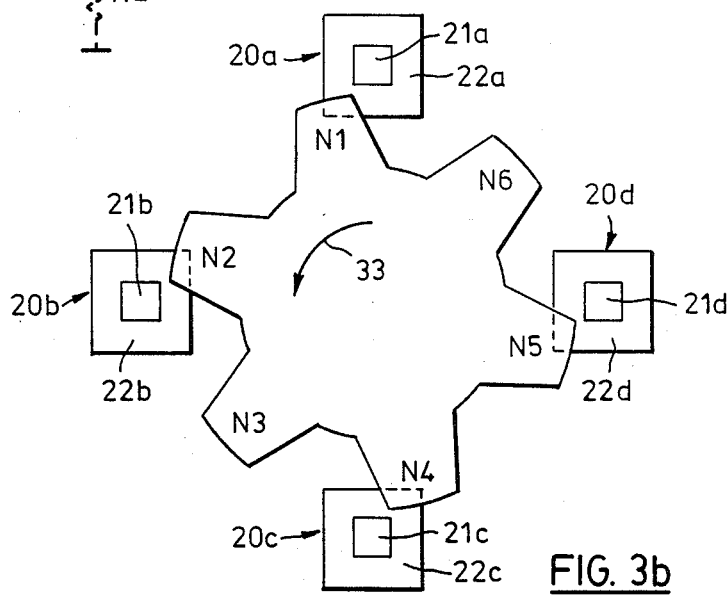

The operation of the apparatus can best be understood by referring to FIGS. 3a and 3b.

For purposes of explanation it will be assumed that the poles of toothed wheel 14 are north poles and thus that the poles of toothed wheel 13 are south poles. It will also be assumed that rotation of rotor 10 in a counter-clockwise direction, as shown by arrow 33, has already started.

When toothed wheel 14 is in the position shown in FIG. 3a, silicon controlled rectifier SCR1 and gate turn off switch device GTO1 are off and no current from the D.C. power supply flows through coils 22a and 22c. As a consequence, electromagnets 20a and 20c are de-energized. Nevertheless, cores 21a and 21c attract poles N1 and N4 respectively of toothed wheel 14 as these seek a minimum reluctance position. This attraction coupled with the inertia of rotor 10 carries rotor 10 to the position shown in FIG. 3b. As poles N1 and N4 move past de-energized coils 22a and 22c respectively from the position shown in FIG. 3a to the position shown in FIG. 3b currents are induced in the coils as a result of movement of poles N1 and N4 past them. The induced current is in a sense such as to charge capacitor C1 through its first connection via diode D3.

Once the position of FIG. 3b has been assumed, an aperture in wheel 25 passes diode 26 resulting in a trigger pulse on conductor 29 which triggers gate turn off device GTO1 into conduction. At the same time a trigger pulse on conductor 30 triggers silicon controlled rectifier SCR1 into conduction. Initially the charge on capacitor C1 will be sufficiently large that diode D1 will be reverse biased and capacitor C1 discharges via thyristor SCR1 through coils 22a and 22c and gate turn off device GTO1. Eventually the charge on capacitor C1 may decrease sufficiently that diode D1 will no longer be reverse biased and current from the D.C. power supply flows in coils 22a and 22c. The current, first from capacitor C1 and then from the supply causes the poles of electromagnets 20a and 20c that are adjacent poles N1 and N4 to become north poles. The resulting magnetic repulsion between electromagnet 20a and pole N1 and between electromagnet 20c and pole N4 causes continued counterclockwise rotation of rotor 10. Silicon controlled rectifier SCR1 turns off in this period as the discharge current from the capacitor falls to zero. After poles N1 and N4 have rotated a predetermined amount beyond electromagnets 20a and 20c respectively, the wheel 25 shuts off light falling on phototransistor 27 from diode 26, applying a negative potential to line 29 and turning off the device GTO1. This results in the D.C. power supply being disconnected from coils 20a and 20c, whereupon a similar cycle is repeated but this time with poles N6 and N3 interacting with electromagnets 20a and 20c respectively. Intermediately, a similar cycle occurs, involving the lower half of the circuit of FIG. 5, the poles N2 and N5 and the electromagnets 20b and 20d respectively. In addition, the same cycle will have been repeated previously but with poles N3 and N6 and electromagnets 20b and 20d respectively.

Of course the same sequence of events is occurring with respect to toothed wheel 13 and electromagnets 20a–20d except that the opposite poles of electromagnets 20a–20d adjacent toothed wheel 13 are alternately energized to form south poles rather than north poles.

In general, the poles on the rotor will always tend to seek positions such as to minimize the reluctance of the magnetic circuits set up between the rotor and the stator. This reluctance will be a minimum in the case of poles adjacent de-energized electromagnets when the poles and magnets are angularly aligned. However, when all of the electromagnets are de-energized, the seeking forces will tend to cancel each other out because of the relative configurations of the rotor and stator. In the case already described of electromagnets energized so that their poles have the same polarity as adjacent poles of the rotor and therefore repel one another, the reluctance will be a minimum when the electromagnet pole is midway between two rotor poles. In the case of electromagnets energized so that their poles have the opposite polarity to adjacent poles of the rotor and therefore attract one another, the reluctance will again be a minimum when the electromagnet pole is aligned with a rotor pole. The connections of the coils 22a, 22b, 22c, 22d may be oriented for operation in either of these two modes, i.e. either repulsion operation or attraction operation. By providing duplicate sets of coils on each electromagnet, with a first winding on a particular magnet in series or parallel with a second winding on an adjacent magnet, both modes may be used simultaneously to obtain greater torque from a given motor configuration. Whilst the sense of the connections to the coils and the orientation of the disc 25 may be altered to accommodate those various modes of operation, the mode of operation of the circuit of FIGS. 4 and 5 remains substantially the same.

In order to maximize the mean torque available from the motor and minimize losses, it is desirable that the electromagnets be energized only when the rotor poles adjacent the electromagnet poles are moving towards a minimum reluctance position. If the magnets are energized during a period when the adjacent rotor poles are moving away from a minimum reluctance position, a countertorque will be produced during this period. This condition is typical for example of a stepper motor operated in a discrete stepping mode, in which the interaction of the rotor and stator produces in each step first an accelerating torque as the rotor moves towards a new minimum reluctance position, and then a holding torque as it reaches and moves through this position. It is however undesirable in a motor intended for continuous running.

Correct energization of the electromagnets is not merely a matter of correctly timing the switching of current to the electromagnet windings since the latter posses substantial inductance, which moreover varies with the reluctance of the magnetic circuit with which they are associated. As a result, the rate of build up of current in the winding, and thus the rate of energization, is determined by the value of this inductance and the potential applied to the winding. As the current builds up, so does the energy stored in the magnetic circuit. In order to de-energize the magnet, it is not sufficient merely to interrupt the current through the winding, since the stored energy must also be removed in some manner. For efficient operation this energy should be recovered and used productively. Furthermore, to obtain a high specific power output from the motor, in the form of good torque at high speeds of rotation, it is necessary that both energization and de-energization of the magnets be as rapid as possible.

In the arrangement described, and referring to FIG. 4, let it be assumed as a convenient starting point that the switching device GTO1 is switched on and current is passing (using the positive to negative current flow convention) from the supply B+ through diode D1, coils 22a and 22c, diode D2 and device GTO1 to the supply ground. The current in the coils 22a and 22c results in a corresponding magnetic flux in the magnetic circuits associated with the coils. Device GTO1 is now turned off, interrupting the circuit through the supply. The tendency of the flux in the magnetic circuits to collapse induces potentials in the coils such as to tend to oppose this collapse, and these potentials result in the forward current in the coils continuing through the alternative path provided by the diode D3, the capacitor C1, and the diode D1. This forward current continues until the potential across the capacitor C1 equals that induced across the coils, by which time most of the available energy from the collapsing magnetic field has been transferred to the capacitor C1. Assuming that thyristor SCR1 remains in a blocking condition, the capacitor will then remain charged since it cannot discharge through the diodes D1 and D3. The time required for this transfer of energy to the capacitor is determined by the resonant frequency of the tuned circuit formed by the windings 22a, 22c and the capacitor C1, being rather less than the period of one half cycle. Oscillation of the circuit is suppressed by the diodes D1 and D3, and therefore by suitable choice of capacitance and inductance value, very rapid de-energization of the magnets can be obtained, whilst the capacitor C1 can be charged to a potential much greater than the supply potential.

When energization of the coils 22a and 22c is again required, device GTO1 is again switched on, and thyristor SCR1 is simultaneously switched on. If the potential at the lower plate of C1 exceeds B+, as will normally be the case, diode D1 will be reversed biased, and current will endeavour to flow from C1 and SCR1 through coils 22a and 22c and device GT02 to ground. The rate of build up of current through the coils will depend on the potential available at the lower plate of C1, provided that its upper plate has a low impedance path to ground, in this case through a terminal of the supply. Since this available potential will usually be much greater than the supply potential, the rate of current build up on the coils will in turn be much greater than would be the case were only the regular supply potential available to produce this build up.

The interaction of the rotor and stator to seek minimum reluctance position is an attempt to minimize the energy stored in the magnetic circuits, the energy released upon resulting relative movement being available as mechanical energy (disregarding iron, copper and frictional losses). When the motor is running, energy will be required from the supply to supplement that available from the capacitor C1 only to make up losses and to replace mechanical energy delivered by the motor to a load. Each time the device GTO1 is switched on, current to the windings will be initially supplied from the capacitor C1. When the potential on the lower plate of C1 drops below the supply potential, make up current will then pass from the supply through diode D1 until the device GTO1 is switched off. Under overrun conditions, the back EMF generated in the coils may be such that potential on lower plate of C1 never drops low enough to allow diode D1 to become forward biased.

In the arrangement shown, the upper plate of capacitor C1 draws current from the supply during its discharge, and in effect appears, so far as the coils are concerned, in series with the load. If the upper plate (as shown in FIG. 4) is connected to ground then it will draw no current from the supply during discharge, but will draw current during charging. Either of these connections may be utilized, or any other connection which provides a low impedance path between the upper plate and the supply.

For various reasons, it may be desirable to withdraw energy from the capacitor C1. Firstly, it may be necessary to avoid the build up of excessive potentials across the capacitor which might cause breakdown of the associated semiconductor devices or the capacitor itself. Seondly, such withdrawal enables energy recovery from the motor during overrun conditions or if the motor is being driven to form a generator. Thirdly, it enables a measure of speed control to be exercised by increasing the rise time of the current in the windings. Finally, it enables the motor to be utilized as a step-up DC to DC converter, since the output potential which can be obtained can be considerably higher than the supply potential. A possible means for achieving such energy withdrawal is illustrated in FIG. 4 in broken lines, in the form of a suitably controlled thyristor SCR2, having its anode connected to the lower plate of C1, and its cathode connected to a load RL.

The timing of the trigger signals applied to the primary switching devices such as GTO1 and the secondary switching devices such as SCR1 is important to the attainment of maximum power output. Some adjustment of the theoretical optimum positions is desirable in order to ensure a particular sense of rotation, and in order to facilitate starting.

In practice, with apparatus of the type shown in FIG. 2 operating in the mode first described, successful results have been achieved by energizing the coil of each electromagnet to repel its associated pole of toothed wheel 14 about 7.5° past top dead centre and maintaining its coil energized until the pole in questions has reached about 22.5° past top dead centre. These figures are exemplary only and should not be construed as limiting. For example, by delaying turn off of a winding, the rotor will be subjected to a countertorque as it moves past its minimum reluctance position, reducing the net transfer of kinetic energy by the rotor and thus reducing motor speed for a given load.

It should be noted that as rotor 10 speeds up (for example as result of increasing the voltage of the D.C. power supply), it is necessary, in order to obtain energization and de-energization at these angles, to move both photocell 27 and light sources 26 relative to timing wheel 25 so that photocell 27 is activated earlier in the cycle. This is because of the finite time required for the triggering current to build up. Movement of these components can be effected manually or automatically. In the latter case the holder for the photocell and light source can be driven by a motor whose output shaft position is responsive to changes in the speed of shaft 11.

While preferred embodiments of this invention have been described herein, the invention is not limited thereto, and those skilled in the art will appreciate that changes may be made therein without departing from the spirit and scope of the invention as defined in the appended claims.

Thus, although in the embodiment described and in the following claims, the connection to the capacitor C1 are described as being made to the ends of the phase winding, it is intended that functionally equivalent arrangements be comprised within the scope of the invention. Thus the connections to the capacitor could be made from an additional portion of the winding, transformer coupled to the remainder.

I claim:

1. In an electric motor having a stator with multiple sequentially energizable phase windings and a rotor magnetized to seek a minimum reluctance position within a progressively moving electromagnetic field produced by said phase windings, first controlled switching means in series relative to a D.C. power supply with each phase winding, and means to control said first switching means to produce said progressively moving electromagnetic field, the improvement wherein (a) a charge storage capacitor is provided for each such phase winding, with one terminal of said capacitor connected by a low impedance path to said supply, and the other terminal having first and second connections establishing alternative low impedance paths to opposite ends of the winding, the first such connection being established by first diode means to that end of the winding connection to the first switching means, the first diode means being oriented to permit low impedance passage to said capactior of forward current continuing in said winding after turn-off of the switching means, and the second such connection being established by second controlled switching means, (b) means are provided to turn on said second switching means substantially simultaneously with said first switching means to provide low impedance passage of current from said capacitor to said end of the winding remote from the first switching means, and (c) second diode means are provided between the supply and said remote end of the winding such as to present a low impedance path for forward current from the supply, but a high impedance to reverse current.

2. A motor according to claim 1, wherein the rotor has a homopolar rotor configuration.

3. A motor according to claim 2, wherein the rotor is permanently magnetized.

4. A motor according to claim 3, wherein the rotor includes a rotatable shaft and permanent magnet means mounted on and fixed to said shaft and having a plurality of spaced apart north poles and a plurality of spaced apart south poles, said poles being movable in two circular paths, the stator includes a plurality of spaced apart electromagnets each including at least one coil comprised by one of said phase windings and mounted so that energization of the coils comprised by different phase windings produces minimum reluctance of the magnetic circuits linking the rotor and the stator at different angular positions of the rotor, and wherein the means to control said first switching means is responsive to rotation of said rotor for generating control signal turning the first switching means in series with each phase winding on as the rotor moves towards a minimum reluctance position and turning said first switching means off before the rotor passes said minimum reluctance position.

5. Apparatus according to claim 4, wherein there are four of said electromagnets spaced 90° apart.

6. Apparatus according to claim 5, wherein there are six of said permanent magnets spaced 60° apart.

7. Apparatus according to claim 4, wherein said first switching means are turned on for permitting energizing current to flow in said coils in a predetermined sequence to create a magnetic field that repels said permanent magnet means after said permanent magnet means have rotated past said electromagnets.

8. Apparatus according to claim 7, wherein said first switching means are turned on for permitting energizing current to flow in said coils in a predetermined sequence to create a magnetic field that attracts said permanent magnet means as said permanent magnet means rotate towards said electromagnets.

9. Apparatus according to claim 4, wherein said first switching means are turned on for permitting energizing current to flow in said coils in a predetermined sequence to create a magnetic field that attracts said permanent magnet means as said permanent magnet means rotate toward said electromagnets.

* * * * *